United States Patent [19]

Baba

[11] Patent Number: 5,796,687
[45] Date of Patent: Aug. 18, 1998

[54] INFORMATION RECORDING AND REPRODUCING APPARATUS WITH OFFSET COMPENSATION CIRCUIT AND METHOD THEREFOR

[75] Inventor: Hisatoshi Baba, Yokohama, Japan

[73] Assignee: Canon Kabushiki Kaisha, Tokyo, Japan

[21] Appl. No.: 590,422

[22] Filed: Jan. 24, 1996

[30] Foreign Application Priority Data

Jan. 27, 1995 [JP] Japan .................. 7-011661

[51] Int. Cl.⁶ .................................. G11B 7/09
[52] U.S. Cl. ................. 369/44.29; 369/44.35; 369/44.34
[58] Field of Search ............. 369/44.29, 44.35, 369/44.36, 44.34, 54

[56] References Cited

U.S. PATENT DOCUMENTS

| | | |
|---|---|---|
| 4,972,395 | 11/1990 | Baba ................................ 369/13 |
| 5,048,002 | 9/1991 | Horie et al. ..................... 369/44.35 |
| 5,251,194 | 10/1993 | Yoshimoto et al. ............. 369/44.29 |
| 5,260,923 | 11/1993 | Baba ............................... 369/44.28 |
| 5,347,503 | 9/1994 | Koyama et al. ................. 369/44.32 |
| 5,351,224 | 9/1994 | Nagata et al. ................... 369/44.29 |
| 5,404,346 | 4/1995 | Koyama et al. ................. 369/44.32 |

FOREIGN PATENT DOCUMENTS 5-298724  11/1993  Japan .

Primary Examiner—Thang V. Tran
Attorney, Agent, or Firm—Fitzpatrick, Cella, Harper & Scinto

[57] ABSTRACT

In an optical information recording/reproducing apparatus provided with an actuator for integrally moving a mirror and an objective lens in the focusing direction, there are provided a device for receiving a light beam reflected by an information medium thereby detecting a tracking error signal indicating deviation of the light beam from an information track, a device for measuring an offset value utilizing the tracking error signal, and a device for correcting the offset contained in the tracking error signal. The offset correcting device corrects the offset at the tracking servo operation, based on the offset value measured by the offset measuring device.

10 Claims, 9 Drawing Sheets

INFORMATION RECORDING AND REPRODUCING APPARATUS WITH OFFSET COMPENSATION CIRCUIT AND METHOD THEREFOR

BACKGROUND OF THE INVENTION

1. Field of the Invention

The present invention relates to an objective lens actuator for use in an optical information recording/reproducing apparatus, and more particularly to offset compensation in the tracking servo therein.

2. Related Background Art

In an optical information recording/reproducing apparatus, an objective lens actuator used therein necessitates two controls in recording information by irradiating a disk-shaped information recording medium with a light spot, namely tracking control for moving the objective lens in the radial direction of the information recording medium in such a manner that the light spot traces the information track, and focusing control for moving the objective lens along the optical axis thereof so as to focus the light spot on the surface of the recording medium.

Also, in an ordinary apparatus, it is necessary to move the optical head or the carriage unit including the objective lens over a wide range in the radial direction of the disk, and, for this purpose, there is provided a mechanism for moving such an optical head or carriage unit.

For achieving a higher speed in the operation of the information recording apparatus, it is necessary to reduce the weight of the movable portion, such as the optical head or the carriage unit. Also, if there are provided an actuator for the objective lens and an actuator for moving the optical head, for moving the light spot in the track crossing direction, the control circuit inevitably becomes complex and expensive. In this regard, there is proposed, in Japanese Patent Laid-Open Application No. 5-298724, a driving device for the objective lens, capable of high-speed access and achieving sufficient weight reduction, disclosing the positional aberration in the center of the laser light beam between a fixed optical system and a movable optical system if a flip-up mirror and an objective lens are integrally moved in the focusing direction, and providing a countermeasure for such a drawback.

However, such a conventional configuration requires a detector in the focusing direction of the actuator, leading to an increase in cost of the entire device and complication of the control circuit. Also, tracking offset is corrected with the output of such a detector, but the level of correction or the correcting sensitivity has to be adjusted at the time of assembly of the apparatus, so that the cost becomes inevitably higher by the increase in the number of assembling work steps. Besides, sufficiently precise offset correction cannot be achieved due to the long-term fluctuation of the performance of the detector or the fluctuation in the characteristics of the disks.

SUMMARY OF THE INVENTION

A first object of the present invention is to provide an information recording/reproducing apparatus which does not require a detector in the focusing direction and is capable of maintaining sufficient precision in the tracking. A second object of the present invention is to provide an information recording/reproducing apparatus capable of highly precise offset correction, even in the use of the detector in the focusing direction, without being influenced by the long-term fluctuation in the performance of the detector or by the fluctuation in the characteristics of the disks.

The foregoing objects can be attained, according to the present invention, by an information recording/reproducing apparatus provided with an actuator capable of integrally moving a flip-up mirror directing a light beam from a light source toward the surface of a disk and an objective lens for condensing said light beam, in the focusing direction, the apparatus comprising:

means for detecting a tracking error signal indicating deviation of the light beam from a track on the disk;

means for measuring the offset value of the tracking error signal generated by the movement of the actuator in the focusing direction, utilizing the tracking error signal;

means for correcting the tracking error signal, based on the measured offset value; and means for moving the position of the light beam on the surface of the disk in the tracking direction, based on the corrected tracking error signal.

Also, the foregoing objects can be attained, according to the present invention, by an information recording/reproducing method for effecting information recording and/or reproduction under focusing control for integrally moving a flip-up mirror for directing a light beam from a light source toward the surface of a disk and an objective lens for condensing the light beam, the method comprising steps of:

detecting a tracking error signal indicating deviation of a light beam from the track on the disk;

measuring the offset value of the tracking error signal generated by movement of the actuator in the focusing direction, utilizing the tracking error signal;

correcting the tracking error signal, based on the measured offset value; and moving the position of the light beam on the surface of the disk in the tracking direction, based on the corrected tracking error signal.

Other objects of the present invention, and the features thereof, will become fully apparent from the following description of the embodiments.

DETAILED DESCRIPTION OF THE PREFERRED EMBODIMENTS

[Embodiment 1]

Figure 1:
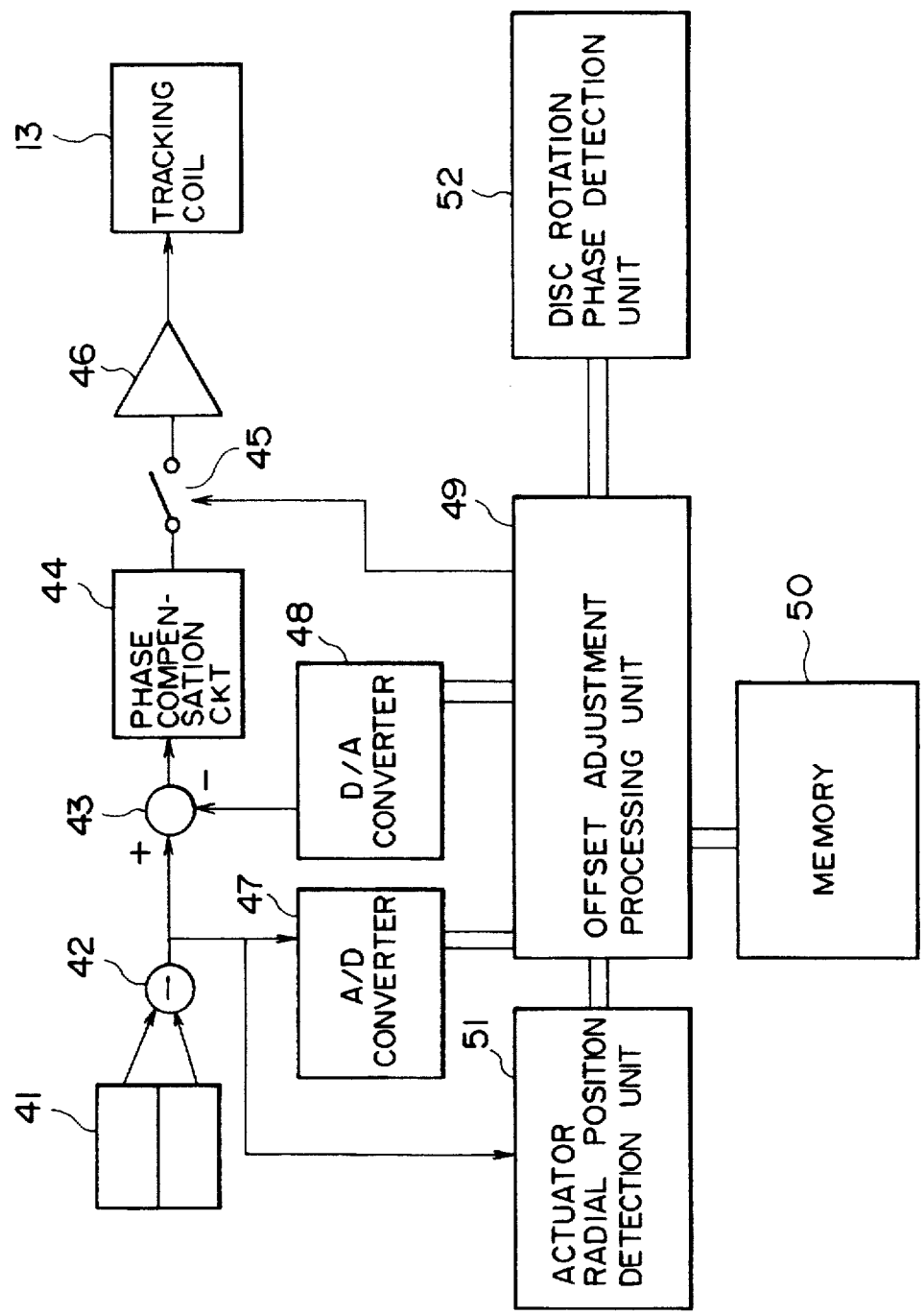
FIG. 1 is a block diagram of a tracking servo system of an information recording/reproducing apparatus of the present invention.

Now the present invention will be discussed in detail with reference to the attached drawings. In FIGS. 2 to 5C, there is shown an actuator 1, which is provided therein with an objective lens 1A and a mirror 1B for directing a laser beam, coming from a fixed optical system (not shown) provided with a light source and fixed on a base portion of the apparatus, toward the above-mentioned objective lens 1A and also guiding the reflected light from an optical disk. On both sides of the actuator 1 there are mounted tracking coils 13, which surround inner yokes 10 extending parallel to the tracking (seeking) direction. On the lateral faces of the coils 13, there are mounted focusing coils 14. On each inner yoke 10, a parallel outer yoke 12 is connected at both ends, and a magnet 11 is fixed on the outer yoke 12 in opposed relationship to the inner yoke 10, thereby forming a magnetic circuit so as to apply a magnetic flux perpendicularly to the coil 13. The inner yokes 10, magnets 11 and outer yokes 12 are fixed on the base member of the apparatus.

The actuator 1 is mounted on rectangular support members 2, 3 which are respectively supported, at a lateral end thereof, by composite parallel plate spring mechanisms 4. Each of the composite parallel plate spring mechanisms is composed of a fixed base member 4A fixed to the rear face of the outer yoke 12, first parallel plate springs 4B fixed at the ends thereof to both ends, in the tracking direction, of the fixed base member 4A and extending perpendicularly to the tracking direction, a movable frame member 4C on which the other ends of the parallel plate springs 4B are fixed, and upper and lower pairs of second parallel plate springs 4D fixed to the upper and lower parts of both ends of the movable frame member 4C, also connected at the other ends to the support members 2, 3 and extending parallel to the parallel plate springs 4B. The ends of the second parallel plate springs 4D in each pair are mutually connected through a hinge portions 4E and 4F formed by folding work, and these hinge portions 4E, 4F can effect vertical hinge action by elastic bending, within a clearance between the parallel plate springs 4B and 4D.

As will be apparent from these drawings, when the actuator 1 moves along the inner yokes 10 by a driving force generated by the interaction of a DC current supplied to the coils 13 and the magnetic flux in the magnetic circuit, the above-mentioned parallel plate springs 4B and 4D are bent to permit the movement in the tracking direction, while supporting the actuator 1. In the configuration of the present invention, when the actuator 1 moves in the tracking direction, the parallel plate springs 4B, 4D bend in the lateral direction in the composite parallel plate spring mechanism 4. However, as the base ends of the parallel plate springs 4B are fixed to the fixed base member 4A, these plate springs 4B move along arc-shaped trajectories at the ends at the side of the movable frame member 4C, while the ends of the plate springs 4D connected to the support members 2, 3 move along arc-shaped trajectories opposed to the above-mentioned ends at the side of the movable frame member 4C, so that the synthesized movements mutually cancel the above-mentioned arc-shaped trajectories and the actuator 1 and the objective lens 1A thereon can move along a precisely linear trajectory. As a result, the optical axis of the laser beam is not deviated from the center of the objective lens 1A, and information recording or reading can be achieved in a stable manner without any loss in the light intensity.

Also, in the present embodiment, a force in the vertical direction is generated by the interaction of a DC current applied to the focusing coils 14 and the magnetic flux in the magnetic circuit, thereby vertically moving the objective lens 1A and the mirror 1B with the bending of the hinge portions 4E, 4F and thus achieving focusing control.

Figure 5A:
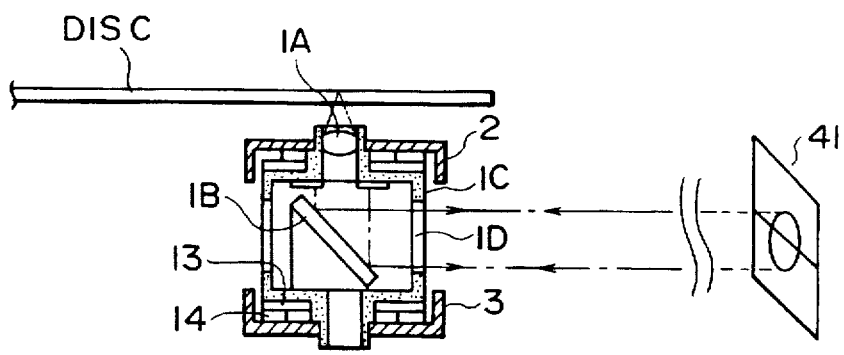
FIGS. 5A, 5B and 5C are views showing the principle of generation of offset in the tracking error signal, depending on the focus position.
Figure 5B:
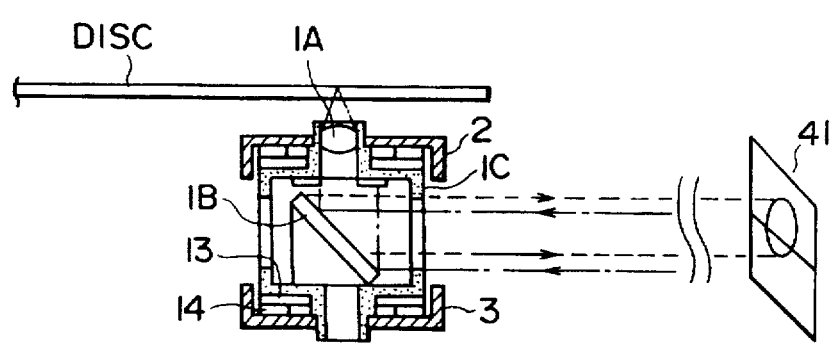

When the actuator 1 is moved in the focusing direction, the center of the light beam, entering from the fixed optical system including the light source into the movable optical system on the actuator 1, or into the mirror 1B, is displaced in the vertical direction. More specifically, as shown in FIG. 5A, a parallel light beam from an unrepresented fixed optical system at the right enters and is reflected by the mirror 1B, and is condensed by the objective lens 1A onto a disc. The light reflected by the disc inversely travels along the incident light path and returns to the fixed optical system.

Figure 5C:
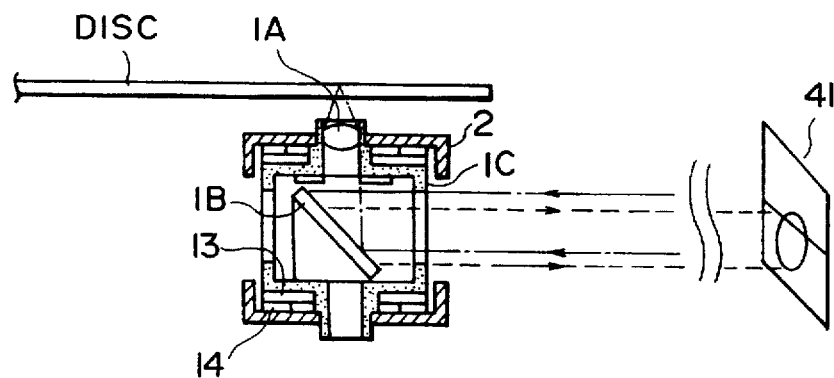

In the state shown in FIG. 5A, in which the actuator 1 is in the standard position in the focusing direction, the center of the light beam reflected by the mirror 1B passes the center of the objective lens 1A, so that the light reflected by the disc inversely travels exactly along the incident light path. On the other hand, in a state shown in FIG. 5B, in which the actuator 1 is positioned above the standard position in the focusing direction, the center of the light beam reflected by the mirror 1B does not pass the center of the objective lens 1A, but passes a position deviated to the right on the drawing. Consequently, the light reflected by the disc passes a position, deviated to the left, in the objective lens 1A, and, upon reflection by the mirror 1B, returns to the fixed optical system as a broken-lined optical beam. Inversely, if the actuator 1 is positioned below the standard position in the focusing direction, as shown in FIG. 5C, the light enters a position, deviated upwards, on the mirror 1B, and the reflected light from the disc returns to the fixed optical system through a position, deviated downwards, of the mirror 1B.

For obtaining a tracking error signal, the fixed optical system receives the reflected light from the disc by a divided sensor, which is schematically illustrated by 41. The sensor has a dividing line, for dividing the sensor into an upper portion and a lower portion, as shown in the drawings. In the state shown in FIG. 5A, the light beam falls exactly on the dividing line, but, in the states shown in FIGS. 5B and 5C, the light beam becomes deviated relative to the dividing line. The tracking error signal is obtained by the subtraction of the outputs of the sensor portions of the divided sensor 41. Thus, if the light entering position into the sensor is deviated, there is generated an offset in the tracking error signal. Stated differently, the focusing error generates an offset in the tracking error.

Now reference is made to FIG. 1, for explaining the configuration for tracking control in the first embodiment of the optical disk apparatus of the present invention.

In FIG. 1, there is provided a two-area divided sensor 41 for detecting the tracking error signal. A subtractor 42 effects subtraction of the outputs of the divided sensor 41 to obtain a tracking error signal. The output of the subtractor 42 is supplied to an adder 43, an A/D converter 47 and an actuator radial position detection unit 51. The adder 43 adds the output of a D/A converter, as an offset correction signal, and the output of the subtractor 42, thereby supplying a phase compensation circuit 44 with an offset-corrected tracking error signal. The phase compensation circuit 44 effects phase compensation for stabilizing the servo system, and its output signal is supplied through a loop switch 45 to a driver 46. The signals subjected to power amplification in the driver 46 are supplied to the tracking coils 13 in the actuator 1, thereby driving the actuator 1 in the tracking direction.

A disc rotation phase detection unit 52 detects the rotational phase synchronized with the rotation of an unrepresented disc. The rotation phase detection unit 52 is so constructed, for example, as to count the output pulses of a rotation encoder attached to a spindle motor for rotating the disc, or to effect synchronization by the output of a Hall element in a three-phase brushless motor constituting the above-mentioned spindle motor, or to count the timing of an address information such as an address portion or a synchronizing signal in the information sector, thereby detecting the rotational phase synchronized with the disc rotation. If the disc is rotated with a constant revolution, it is possible to achieve equivalent detection of the rotational phase by a timer-counter which detects at least a timing signal per rotation of the disc and is reset at the timing of detection.

The actuator radial position detection unit 51 serves to detect the position of the actuator 1 in the radial direction of the disc, and can detect the position of the actuator 1, for example, by counting the number of crossed tracks, utilizing the tracking error signal as shown in FIG. 1. Such a function can be easily realized by a configuration similar to the seeking mechanism by the track counting in the commercially available apparatus of this sort. Though not illustrated, it is also possible to detect the radial position of the actuator 1 by reproducing addresses present on the disc. Furthermore, the position of the actuator 1 can also be known by an external detector, such as a linear encoder or a position sensing diode.

In FIG. 1 there are also provided a memory 50 for storing data for offset adjustment; an A/D converter 47 for digitizing the output tracking error signal from the subtractor 42, for supplying to an offset adjustment unit 49; and a D/A converter 48 for converting offset data, released from the offset adjustment unit 49, into an analog signal.

The offset adjustment unit 49 effects measurement of the offset of the tracking error signal, setting of correction data for the offset, and operation of a tracking servo loop switch 45.

The offset adjustment unit 49 is usually realized by a microcomputer (CPU), which effects not only the offset adjustment but also other control operations of the entire apparatus, including loading/ejection of the disc in response to the actuation of an operating button, start/stop of the disc rotation, management of the information data, and focusing servo control. These other control operations are not shown in the drawing as they are not related to the present invention. In the hardware structure, the A/D converter 47, D/A converter 48, memory 50, actuator radial position detection unit 51 and disk rotation phase detection unit 52 can naturally be formed as a one-chip IC including the CPU. It is furthermore possible to also digitize the subtractor 42, adder 43 and phase compensation unit 44 or to form these parts into a one-chip IC, utilizing software servo technology.

The sequence of such software servo technology will be explained in the following. When the power supply is turned on for the optical disc apparatus of the present invention, the CPU therein checks whether a disc is loaded. If it is already loaded, a spindle motor is started. If the disc is loaded by the user, the CPU detects the loading and similarly starts the spindle motor. When the spindle motor reaches a predetermined speed, a laser is turned on.

Then, the CPU activates the focusing servo operation, while moving the actuator 1 in the focusing direction. Based on the focus error signal obtained from the reflected light from the disc, the CPU detects the start timing of the focusing servo operation and activates the focus servo loop. Thus, the light spot condensed by the objective lens 1A can be focused on the surface of the disc.

Figure 6A:
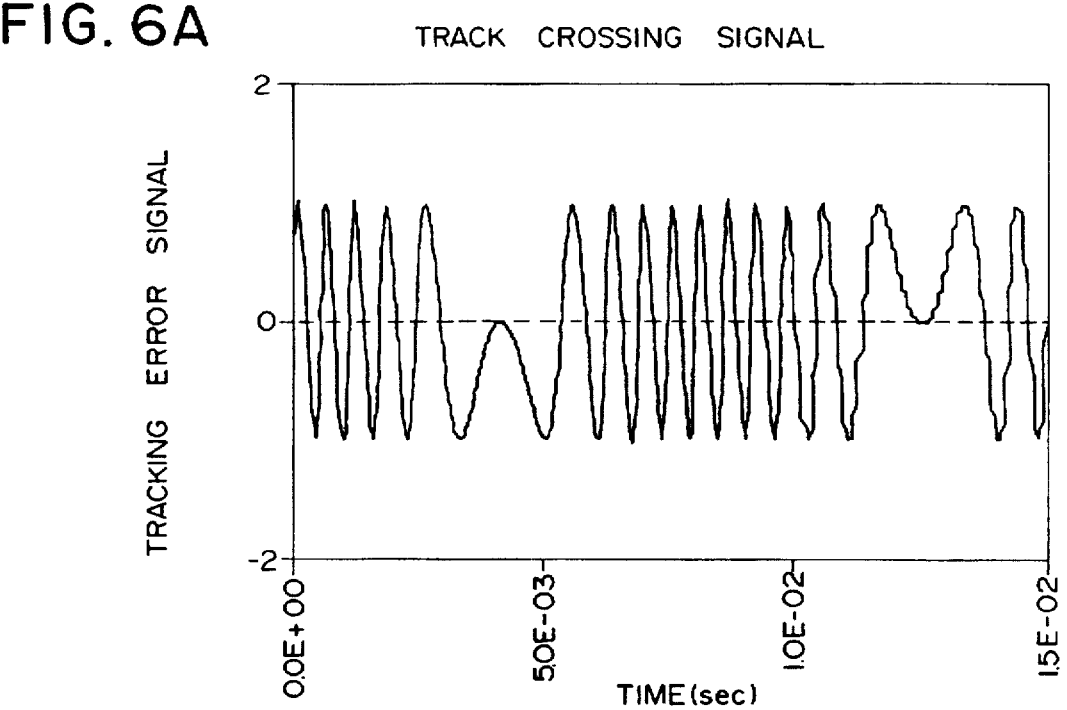
FIGS. 6A and 6B are wave form charts showing tracking error signals in the track crossing in the information recording/reproducing apparatus of the present invention.
Figure 6B:
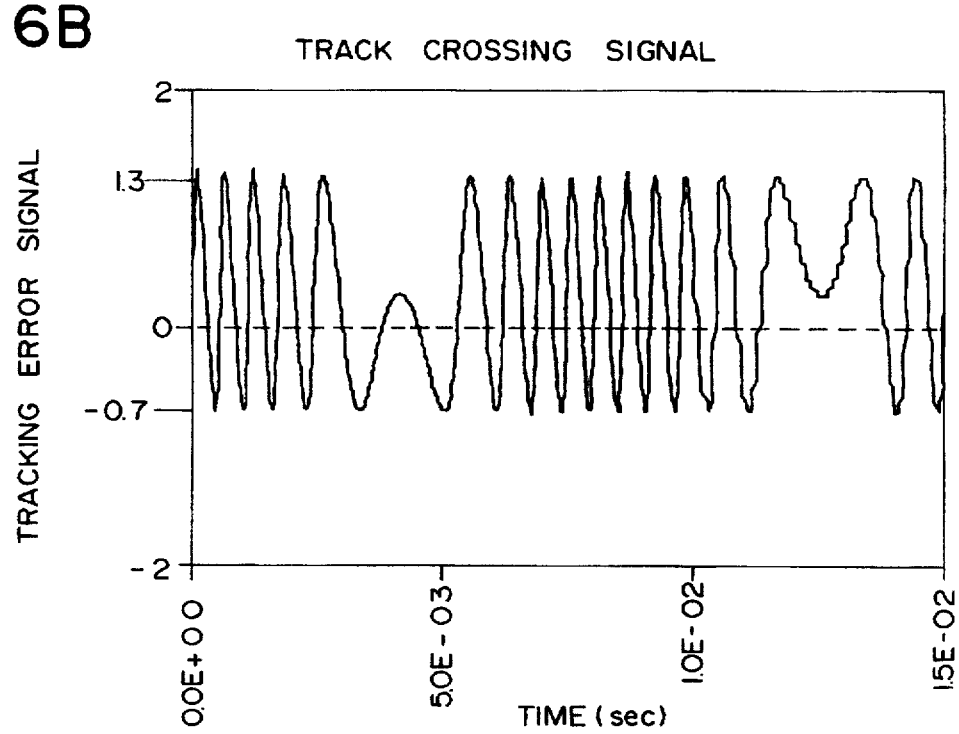

In this state, a tracking error signal as shown in FIG. 6A can be observed, as a result of track crossing by the light spot owing to the decentralization of the disc. FIG. 6A shows a state in which the optical disc apparatus and the position of the optical disc in the focusing direction are in the standard position, wherein the amplitude of the tracking error signal is in a level of ±1, without any offset. FIG. 6B corresponds to the state shown in FIG. 5B, in which the disc and the light beam from the fixed optical system are positioned closer to each other than the standard situation. As the light entering the sensor 41 is deviated from the center thereof, the tracking error signal is in a range from −0.7 to +1.3, with a positive offset. Similarly, in a state shown in FIG. 5C, the tracking error signal will be, opposite to the state shown in FIG. 6B, in a range from −1.3 to +0.7, with a negative offset.

The offset adjustment unit 49 accesses such a tracking error signal with a sampling frequency, for example, of 100 KHz, and measures the positive and negative peak values of the tracking error signal. It then calculates the average of the positive and negative peak values, thereby obtaining the offset of the tracking error signal. For example, in the state of FIG. 6B with a positive peak of 1.3 and a negative of −0.7, the offset of the tracking error signal is calculated as +0.3 as the average.

Then, for correcting the offset of the tracking error signal, the offset adjustment unit 49 sets a digital value corresponding to a correction value +0.3 for the measured offset, in the D/A converter 48. In this manner, the adder 43 (in fact composed of a subtractor) releases a signal without offset, as shown in FIG. 6A.

Then, the tracking servo operation is activated by closing the tracking servo loop switch 45. The above-mentioned correction of offset enables exact tracking along the center of the track.

By measuring and correcting the offset of the tracking error signal at the starting of the apparatus (at the start of a recording or reproducing operation of the disk) or at the disk loading, it is rendered possible to compensate for the error resulting from the positional deviation of the fixed optical system and the actuator in the focusing direction, induced by the individual fluctuation of the apparatus or the disk. In contrast to the offset of the tracking error signal, generated by the movement of the objective lens in the tracking direction in the apparatus with the ordinary actuator a (so-called two-step tracking actuator composed, for example, of an objective lens actuator and a carriage actuator), the position in the focusing direction is mostly determined when the disc is mounted. Usually the deviation in the focusing position, namely that between the light beam from the fixed optical system and the mirror in the focusing operation, is on the order of ±500 µm in consideration of the fluctuation in the apparatus and in the disk, but, in practice, the range of such a deviation is limited to about ±50 µm once the combination and mounting state of the apparatus and the disc are determined. Consequently, the precision of the tracking control can be significantly improved by adjusting the offset of the tracking error signal only at the mounting of the disc.

The offset of the tracking error signal can be measured, as explained in the foregoing, by the measurement of the positive and negative peak values, but it can also be realized by determining the DC component of the A/D converted data. This can be realized by averaging the data sampled during a turn of the disk, or during 16.66 ms in the case of disk revolution of 3600 rpm.

|Embodiment 2|

For more precise correction of the offset of the tracking error signal, the tracking offset by the focusing position of the actuator is measured in plural positions, and a correction is made according to the track position.

Figure 2:
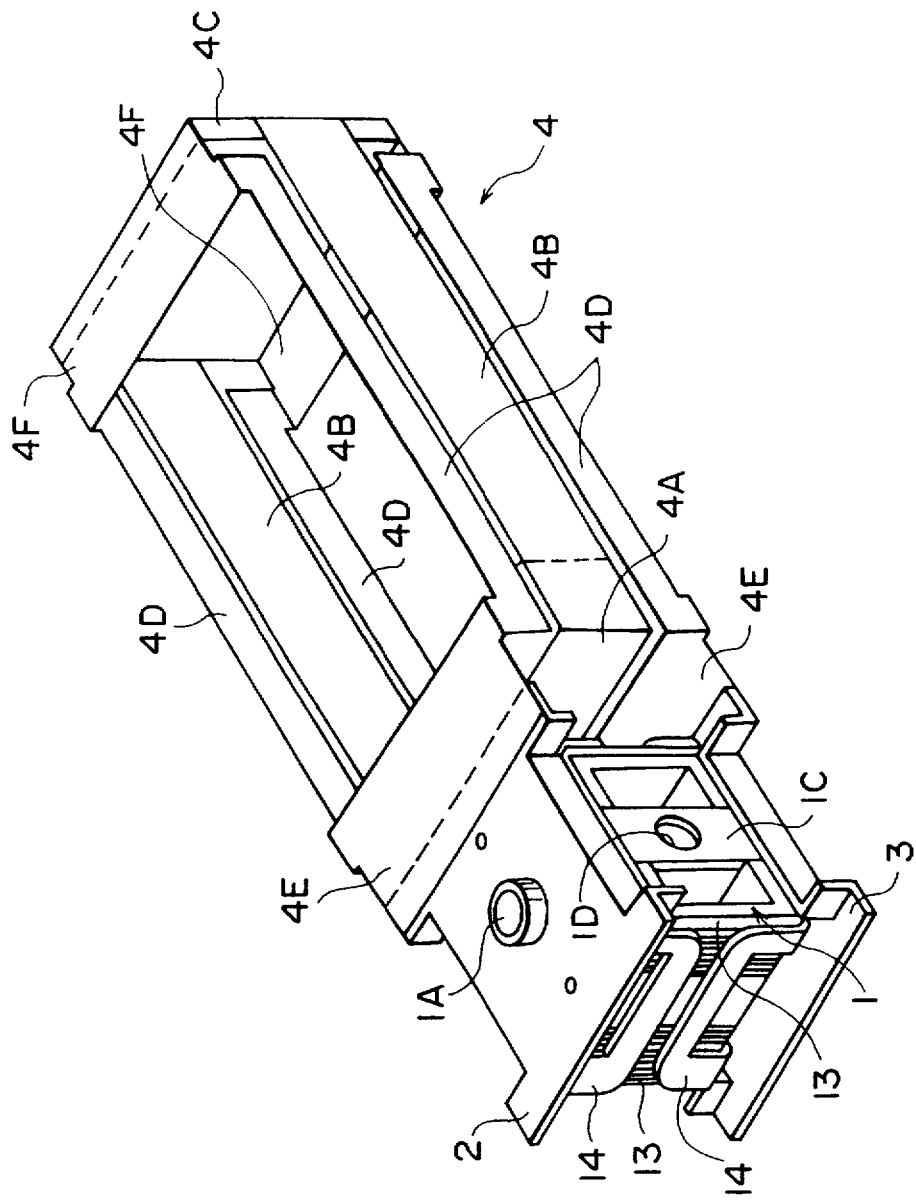
FIG. 2 is a perspective view of an actuator for use in the information recording/reproducing apparatus of the present invention.
Figure 3:
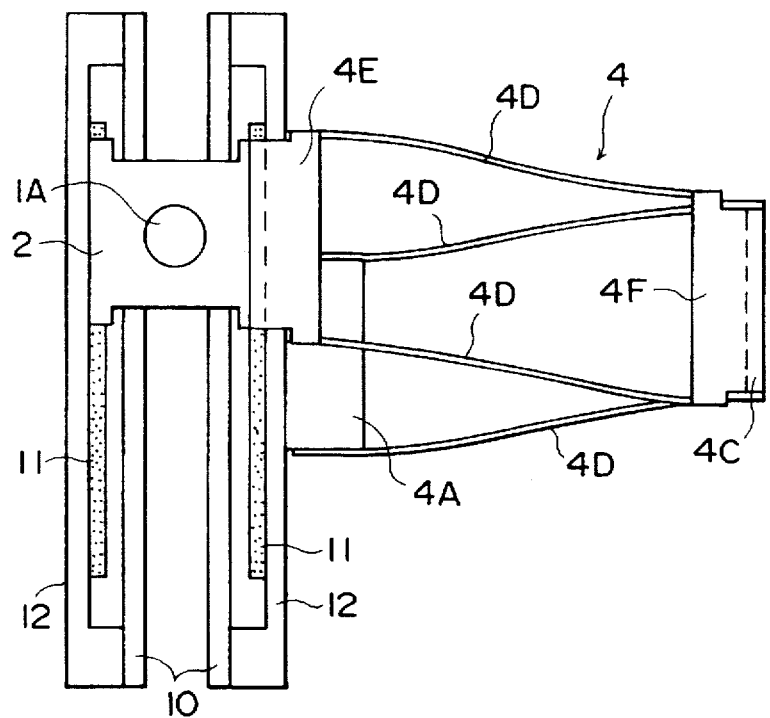
FIG. 3 is a plan view of the actuator for use in the information recording/reproducing apparatus of the present invention.
Figure 4:
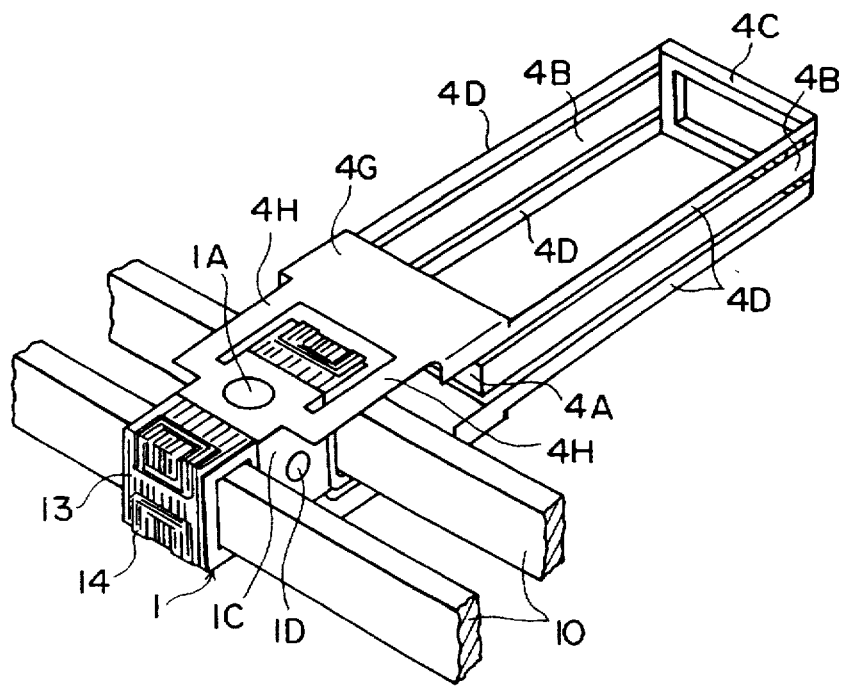
FIG. 4 is a perspective view of another actuator for use in the information recording/reproducing apparatus of the present invention.

The actuator shown in FIG. 2, if the tracking coils 13 are not energized, is positioned at the approximate center in the tracking (seeking) direction, by the returning force of the support springs. At first the offset of the tracking error signal is measured in this state, by the method explained in the foregoing, and the obtained offset is named as OF2 (suffix indicating the second OFFSET). Also, the position of the actuator in the tracking direction can be known by the actuator radial position detection unit 51, or by reproducing the address information on the disc, and is named as ADR2. The data OF2 and ADR2 are respectively stored in the memory 50.

Then, the tracking coils 13 are energized to move the actuator 1 toward the external periphery of the disc, either by generating a suitable driving force corresponding to the returning force of the springs, or by controlling the movement through counting of the tracking error signals at track crossing. It is naturally possible also to effect the movement by a seeking operation, through the designation of an address in the external peripheral area. After such movement to the external peripheral area, the offset of the tracking error signal is measured in the aforementioned manner, while the tracking servo is turned off, and the obtained offset is named as OF3. Also, the position of the actuator 1 in the tracking direction can be known by reproducing the address information of the disc, as in the case when the actuator is in the central position, and this position is taken as ADR3. The data OF3 and ADR3 are stored in the memory 50.

Then, the actuator 1 is similarly moved to an internal peripheral position, and the tracking offset OF1 and the address ADR1 are stored in the memory 50.

Figure 7:
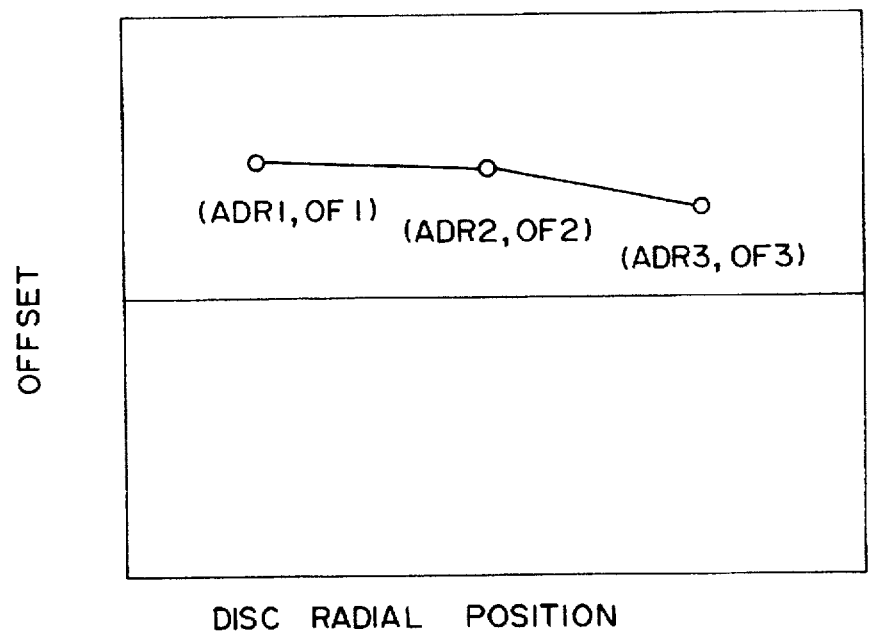
FIG. 7 is a chart showing the relationship between the radial position on the disk and the offset generated in the tracking error signal.

FIG. 7 shows an example of the measured data. For a disc with about 10,000 tracks starting from a 0-th innermost track, the ADR1 ADR2 and ADR3 are respectively taken at about 1000th, 5000th and 9000th tracks, and the OF1, OF2 and OF3 are respectively assumed, for example, to be 0.3, 0.25 and 0.2.

After the offset measurements, the offset adjustment unit 49 sets correction data in the D/A converter 48, according to the position of the actuator 1 in the tracking direction, detected by the actuator radial position detection unit 51.

More specifically, the disc is divided into three zones, for example, from address 0 to 3300, from 3301 to 6600, and from 6601 to 10000, and a correction offset of 0.3, 0.25 or 0.2 is set in the D/A converter 48 respectively if the actuator is currently positioned in the internal, middle or external zone.

Such a correction of the offset of the tracking error signal depending on the radial position of the actuator on the disc enables more precise tracking than in the foregoing embodiment.

The position of the actuator 1 in the radial direction can be known not only by the reproduction of the address but also by counting of the tracking error signals or by the driving force of the tracking coils required for resisting the returning force of the springs.

When the actuator 1 is in an external peripheral position, a force is generated by the springs toward the internal periphery, so that a DC driving force is generated toward the external periphery. Based on this principle, the radial position of the actuator 1 can be known by observing the DC component of the driving current or voltage, even when the tracking servo is turned on or while the light beam follows a track. It is therefore possible to know the position of the actuator 1 in the radial direction and to effect offset correction corresponding to the position, even while the tracking servo is turned on.

More preferably, linear approximation is employed for interpolating the measured three points. If the actuator 1 is positioned at an address ADR4 between ADR1 and ADR2, the corresponding correction offset OF4 can be obtained by:

OF4=(OF2−OF1)/(ADR2−ADR1)*(ADR4−ADR1)+OF1.

It is also possible to reduce the process time required for linear approximation, by preparing a correction data table after the measurement of offsets in three points. For example, the calculation time for linear approximation can be significantly reduced by dividing the radius of the disc into 10 zones, preparing a table of the correction offsets in these 10 zones by linear approximation, storing this table in the memory and effecting tracking servo control by reading a correction offset from the memory corresponding to each track position.

|Embodiment 3|

For achieving precise correction for the offset of the tracking error signal even in a disk with a distorted shape, the tracking offset caused by the focusing position of the actuator is measured in plural positions in the circumferential direction of the disc, and the correction is also made depending on the circumferential position.

In a disc showing significant surface vibration in the rotation, the position of the actuator in the focusing direction varies significantly during a rotation of the disc. Such variation in the position of the actuator in the focusing direction also generates an offset in the tracking error signal. For correcting such offset, the rotational phase of the disc has to be known. In FIG. 1, the disk rotational phase detection unit 52 serves this purpose. It can be composed, for example, of a rotary encoder mounted on the spindle motor for rotating the optical disc. If the encoder generates 10 pulses per turn, the disc rotational phase detection unit 52 has a counter to be reset at 10 counts. The rotational angle or phase of the disc can be known by referring to this counter. It may also be known by counting address signals, which are provided in plural units per rotation on the disc. Furthermore, when case the spindle motor is composed of a brushless motor, the timing signals for switching the driving phases may be used for detecting the rotational phase. Such a timing signal is generated by a Hall element attached to the motor, or by an inverse electromotive force generated by the driving coils. Also, if the disc is rotated at a constant speed, it is possible to detect the rotational phase by a timer which measures the time based on a synchronized signal generated per each turn of the disc. For example, if the disc is rotated at 3600 rpm, by entering pulses of an interval of 1 ms in the course of 16.66 ms per turn into the counter and also entering a resetting pulse into the counter in each turn of the disc, there can be obtained counter values from 0 to 16, synchronized with the disc rotation and indicating the rotational phases.

Figure 8:
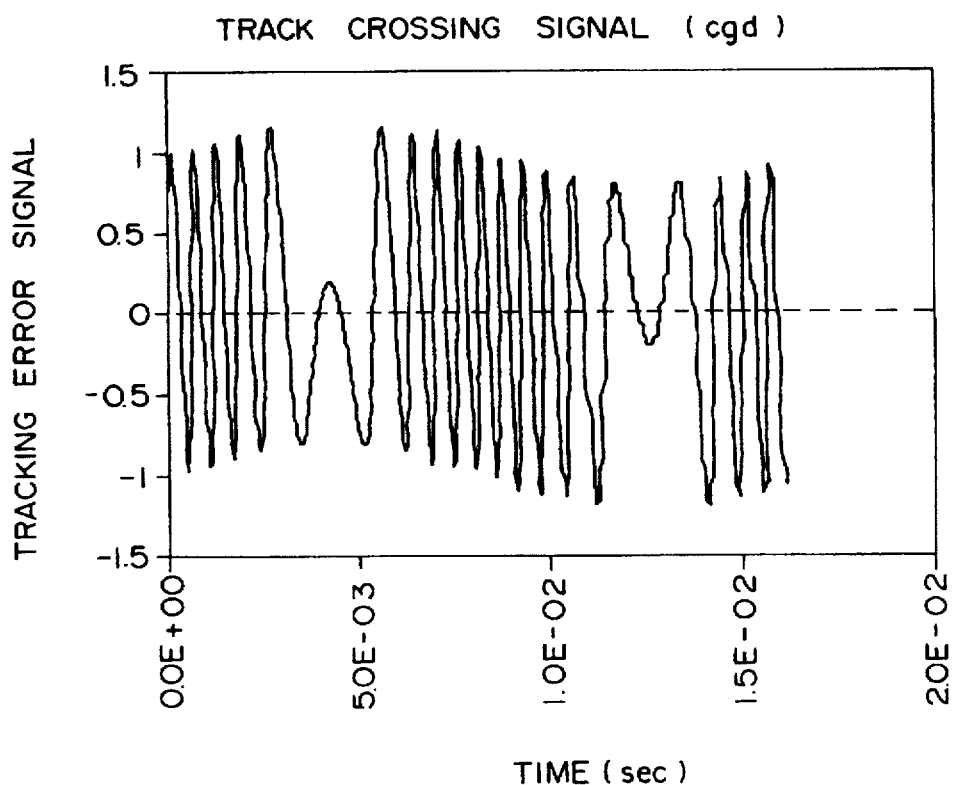
FIG. 8 is a chart showing an offset in the tracking error signal resulting in the disk rotation.

FIG. 8 shows a tracking error signal at track crossing, when the tracking error signal shows a significant offset in the disc rotation. There is shown an example of a disc revolution of 3600 rpm, wherein the tracking error signal shows fluctuation in synchronization with the disc rotation.

Though FIG. 8 shows a sinusoidal fluctuation, the form of the fluctuation may assume various forms depending on the shape of the disc. The fluctuation is determined by the position of the disc in the focusing direction.

The offset correcting means in the present embodiment will be explained in the following. When the focusing servo is activated as in the foregoing embodiment, there is observed a wave form as shown in FIG. 8, as a result of disc rotation. The offset adjustment unit 49 measures the offset of the tracking error signal accessed by the A/D converter 47, while referring to the rotational phase detected by the disk rotational phase detection unit 52. The offset measurement can be basically conducted in the aforementioned manner. Plural measurements are conducted during 16.66 ms corresponding to a rotation of the disc, and the measured values are averaged, based on the rotational phase of the disc.

In the following, there will be explained a case where the rotational phase of the disc is detected with the aforementioned counter for counting from 0 to 16, utilizing a 1 ms timer.

For simplicity of the explanation, the circumference of the disc is divided into four zones, namely from count 0 and upwards, from count 4 and upwards, from count 8 and upwards, and from count 12 and upwards.

The offset adjustment unit 49 measures the offset of the tracking error signal, while referring from time to time to the count of the disc rotational phase detection unit 52.

The offset is measured by averaging the data digitized by the A/D converter 47. Prior to the start of offset measurement, there are cleared four accumulation memories and four data number memories, corresponding to the four zones divided in the circumference of the disc. When the measurement is started, if the count is equal to or higher than 0 but smaller than 4, the data from the A/D converter 47 is accumulated in an accumulation memory 0–4 provided on the memory 50, and the count of a data number memory 0–4 is increased by one. At each sampling by the A/D converter 47, the contents of the accumulation memory and the data number memory are renewed. When the counter of the disc rotational phase detection unit 52 reaches 4 by the disc rotation, the data from the A/D converter 47 is accumulated in an accumulation memory 4–8 and the content of the data number memory 4–8 is increased by one. Thereafter, when the count reaches 8 but is less than 12 by the disc rotation, similar operations are conducted on an accumulation memory 8–12 and a data number memory 8–12, and then the accumulation is made finally in an accumulation memory 12–16.

Finally, the average is obtained by dividing the content of the accumulation memory by the count of the data number memory, and represents the offset of the tracking error signal in a corresponding rotational phase. The obtained averages are respectively stored in offset memories 0–4, 4–8, 8–12, . . . For improving the precision of offset measurement, the measurements for averaging are preferably conducted over plural turns of the disk. It is also possible to improve the precision of offset measurement, by energizing the tracking coils so as to cause a small vibration of about 200 Hz and ±20 µm in the actuator, thereby increasing the number of track crossings.

The offset correction can be executed by recognizing the rotational phase of the disk by the count of the counter of the disk rotational phase detection unit 52 and setting a correction offset value in the D/A converter 48, corresponding to the rotational phase. For example, if the counter of the disc rotational phase detection unit 52 has a count 2, an offset value previously measured and stored in the offset memory 0–4 is read therefrom and set in the D/A converter 48. Also, when the count reaches 4 by the rotation of the disc, offset data is read from the offset memory 4–8 and set in the D/A converter 48. It is possible to correct the offset of the tracking error signal, varying in synchronization with the rotation, by setting, into the D/A converter 48, the value of an offset memory corresponding to the counter value.

For further precise correction, the four measured data are interpolated by linear approximation. In the foregoing explanation, four offset data are obtained per rotation of the disc, but the intermediate rotational phase can be interpolated by linear approximation. As the data in the offset memory 0–4 represents an averaged offset in the rotational phases 0 to 4, it can be regarded as the data at a disc rotational phase "2". Similarly, the data in the offset memory 4–8 can be regarded as the data at a phase "6". Based on these data, the offset correction data can be calculated, by linear approximation, within a range from the rotational phase 2 to 6. More specifically, the correction data at a phase "x" can be given by:

Correction data=|(OM4–8)–(OM0–4)|*|x|/(|6|–|2|)

In this manner it is rendered possible to eliminate the offset of the tracking error signal, generated by the displacement of the actuator 1 in the focusing direction, as a result of disc rotation, thereby achieving highly precise tracking control.

It is naturally possible also to divide the circumference of the disc into 16 zones and to prepare a data table corresponding to such 16 zones, by linear approximation. Such a method will not be explained in more detail as it is basically the same as the aforementioned case of dividing the disc radius into plural zones. Also, in this division of the circumference of the disc, the calculation of linear approximation is required only in the preparation of the table, and the correcting operation can be achieved by mere reference to the table. Consequently, the burden on the control CPU including the offset adjustment unit 49 can be reduced, and the CPU can be used for other tasks.

For achieving further precise correction of the tracking offset resulting from the focusing position, there is prepared a two-dimensional table with 10 zones in the radial direction and 16 zones in the circumferential direction of the disc. The offset data are measured for different rotational phases of the disc in each of plural positions in the disc radius, and the table is thereafter prepared by interpolation, for example, by linear approximation.

The detailed tracking correction based on the two-dimensional table provides a correcting precision comparable to that achievable with a detector such as a focus position sensor. Such a method also corrects the fluctuation in the characteristics on the disc surface at the same time, and, in consideration of this point, the offset correction in this case is more precise than that with the focus position sensor.

[Embodiment 4]

In the following, there will be explained, with reference to FIG. 9, a method of precise correction for the tracking offset induced by the focusing position of the actuator.

Figure 9:
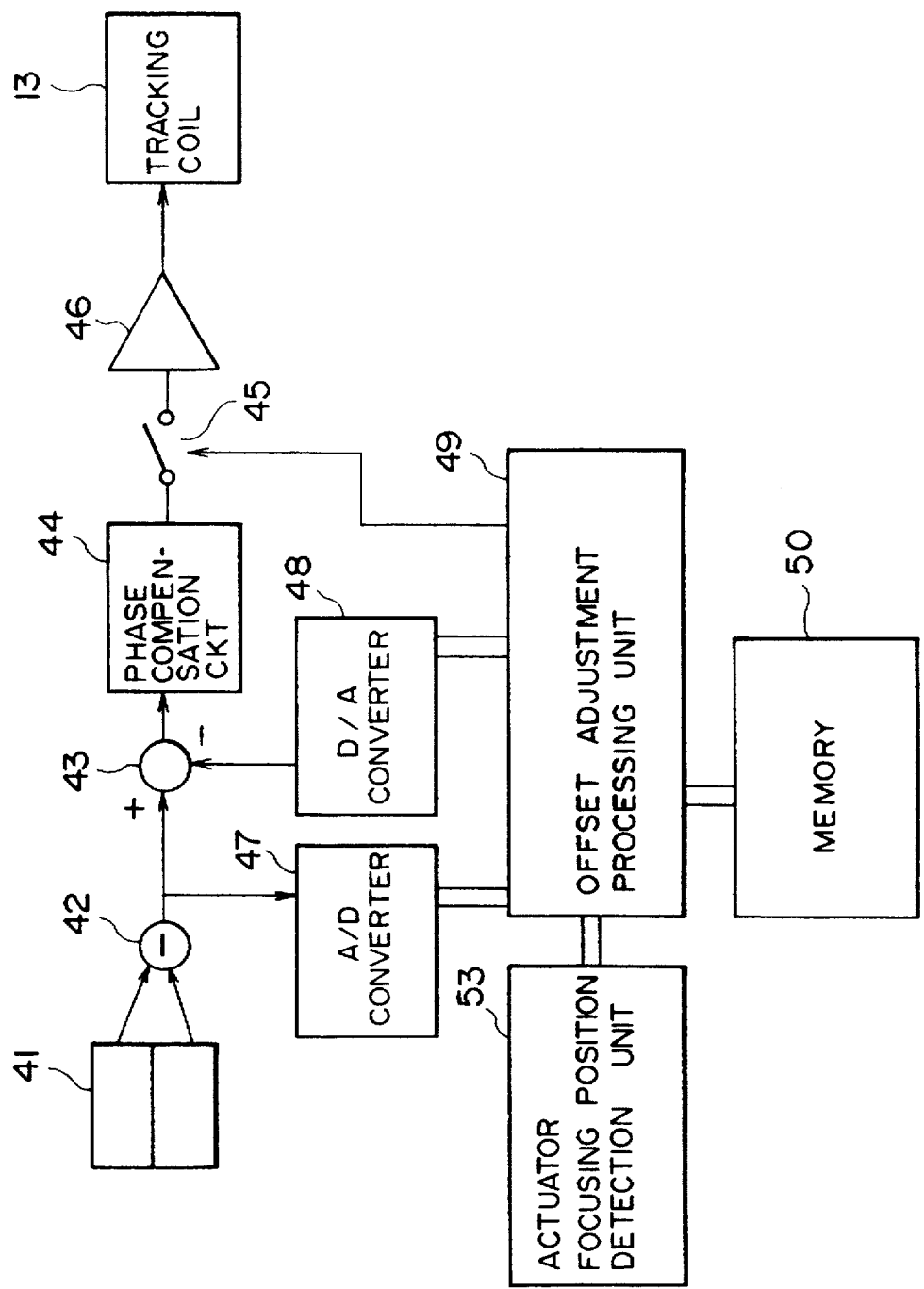
FIG. 9 is a block diagram of a tracking servo system in another embodiment of the present invention.

In the configuration shown in FIG. 9, there is provided an actuator focus position detection unit 53, instead of the actuator radial position detection unit 51 and the disc rotational phase detection unit 52 in the foregoing embodiments.

Figure 10A:
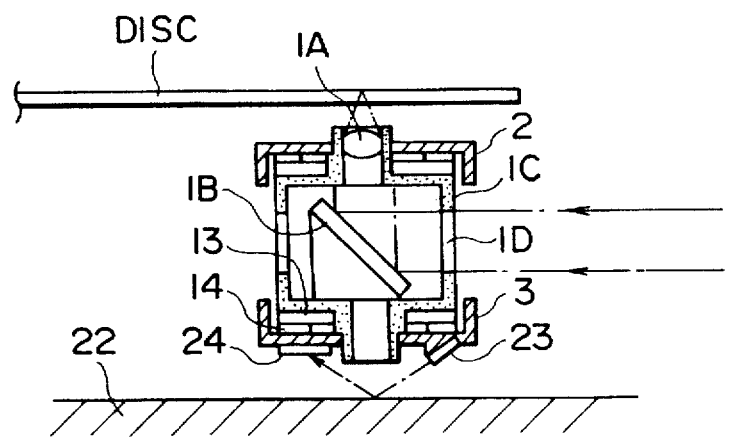
FIGS. 10A, 10B and 10C are views showing a focus position detector.
Figure 10B:
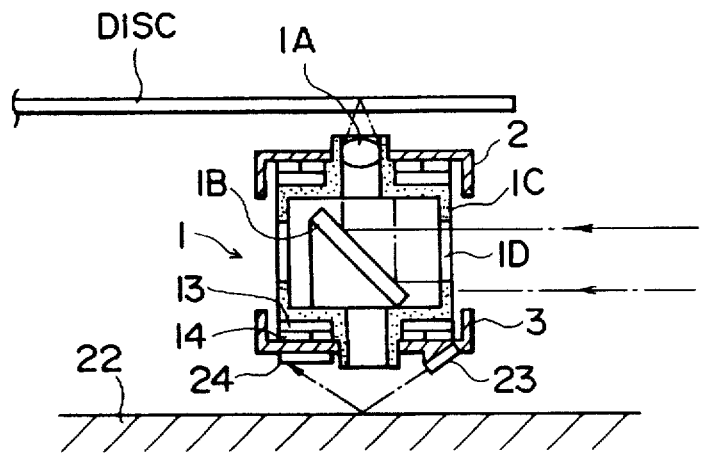
Figure 10C:
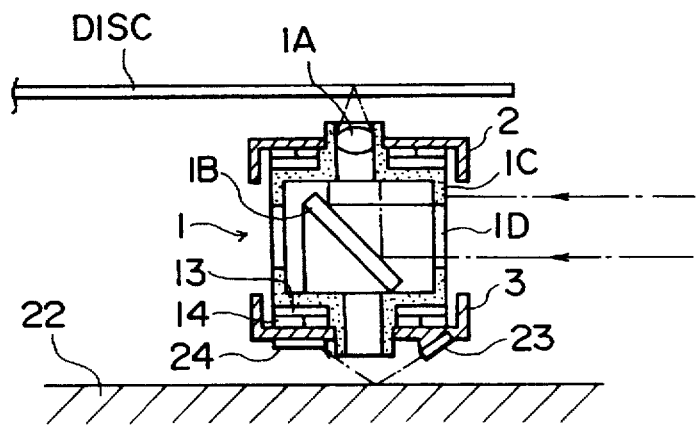

This actuator focus position detection unit 53 serves to detect the position of the actuator 1 in the focusing direction, and is composed of a position detecting sensor, as exemplified in Figs. 10A to 10C. The sensor is composed of a reflecting plate 22 fixed on the base member of the apparatus, below the actuator 1 for the objective lens 1A, and a light-emitting element 23 and a photosensor 24 provided under the actuator 1 in opposed relationship to the reflecting plate 22. The light emitted from the light-emitting element 23 and reflected by the reflecting plate 22 is received by the photosensor 24, and the distance between the actuator 1 and the reflecting plate 22 is detected from the variation in the amount of the thus received light. Also, for the purpose of simplicity, an A/D converter is provided in the actuator focus position detection unit 53. The analog position signal detected by the sensor is converted into a digital signal by the A/D converter and is supplied to the offset adjustment unit 49.

The technology for correcting the offset of the tracking error signal utilizing a position detector in the focusing direction is disclosed in Japanese Patent Laid-Open Application No. 5-298724 as already explained in the foregoing, but such technology is associated with a drawback that the offset to be corrected is fixed at the time of manufacture of the apparatus. More specifically, as the correcting output signal is obtained by multiplying the output of the position detecting sensor with a predetermined coefficient, an error results in the offset correction except for a disk matching such coefficient. Also, the position sensor is composed, for example, of an LED which inevitably shows a variation in performance after a prolonged time, so that the detection of the position in the focusing direction becomes erroneous after a prolonged time of use or by a change in the temperature in the apparatus. Consequently, exact correction of the offset in the tracking error signal cannot be expected. In the similar manner as the tracking error signal is significantly affected by the guide groove of the disc, the offset of the tracking error signal, caused by the focusing position, fluctuates significantly by the disc characteristics. If such an error in the offset correction, resulting from such disc-to-disc fluctuation, is neglected, the precision of tracking is significantly deteriorated, and the reliability of data recording and reproduction is lowered. Also, it becomes impossible to increase the memory capacity of the disc by reducing the track pitch, as the accuracy of tracking cannot be guaranteed.

It is therefore necessary to automatically correct the offset of the tracking error signal, resulting from the focusing position, according to each disc.

The offset of the tracking error signal can be measured by certain methods explained in the foregoing, for example, by averaging the positive and negative peaks of the tracking error signal at the track crossing, or measuring the average, or the DC component, of all the sampled tracking error signals. For measuring the offset in each of the divided zones along the circumference of the disc, there is employed a method of measurement separated in the circumferential direction of the disc, as explained in the foregoing.

The sequence of such measurement will be explained in the following. When the power supply is turned on for the optical disc apparatus of the present invention, the CPU therein checks whether a disc is loaded. If it is already loaded, a spindle motor is started. If the disc is loaded by the user, the CPU detects the loading and similarly starts the spindle motor. When the spindle motor reaches a predetermined speed, a laser is turned on.

Then, the CPU activates the focusing servo operation, while moving the actuator 1 in the focusing direction. Based on the focus error signal obtained from the reflected light from the disc, the CPU detects the start timing of the focusing servo operation and activates the focus servo loop.

Thus, the light spot condensed by the objective lens can be focused on the surface of the disc.

Then, the actuator is placed at an approximate center in the tracking (radial) direction. The actuator utilizing a spring support as in the present embodiment can be positioned at the approximate center of the radius of the disc, by the absence of energization of the tracking coils.

The output of the actuator focus position detection unit 53 is measured in this state. As the focus position varies by the rotation of the disc, an average focus position is measured by averaging the output of the actuator focus position detection unit 53 at least over a revolution of the disc. At the same time, the offset of the tracking error signal is measured in the method explained in the foregoing. The average focus position and the measured offset are respectively named as FP1 and OF1.

Then, the actuator is moved, in the tracking (radial) direction, toward the external or internal peripheral area. In the following explanation, it is assumed to be moved to the external periphery.

The actuator can be moved to an external peripheral position of the disc, by giving a suitable driving force to the tracking actuator. The disc radial position detection unit 51 in FIG. 1 is unnecessary because a high positioning accuracy is not required, but such exact positioning may be conducted with such a detection unit 51.

At such an external peripheral position of the disc, the output of the actuator focus position detection unit 53 is measured again, and the offset of the tracking error signal is measured at the same time. The average focus position and the offset, thus measured, are respectively named as FP2 and OF2.

Figure 11:
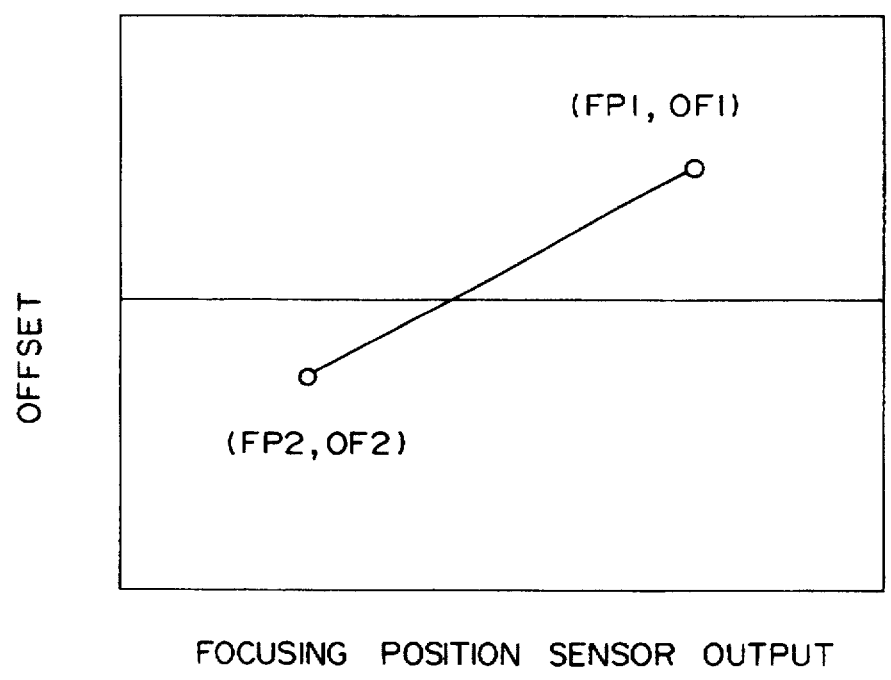
FIG. 11 is a chart showing the relationship between the output of the focus position detector and the offset of the tracking error signal.

FIG. 11 shows the plotting of the measured results. The variation in the radial position on the disc provides the ability to obtain the offsets of the tracking error signal in different average focus positions of the disc. Based on the measured data of these two points, there is calculated the relationship between the output of the focus position sensor and the offset to be corrected of the tracking error signal. More specifically, there are determined coefficients a, b in a first-order equation $y=a*x+b$, wherein x is the sensor output and y is the offset:

$$OF1=a*FP1+b$$

$$OF2=a*FP2+b$$

By solving these simultaneous equations, there are obtained:

$$a=(FP1-FP2)/(OF1-OF2)$$

$$b=OF2-a*FP2$$

Thereafter, in the information recording or reproduction, or in the seeking operation, the correction of the offset of the tracking error signal can be achieved by calculating the correcting offset y according to $y=a*x+b$ with the above-mentioned coefficients a, b and setting the correcting offset in the D/A converter 48.

It is also possible to utilize a correction offset data table, employing the output of the actuator focus position detection unit 53 as the address. For example, if the actuator focus position detection unit 53 has a dynamic range of ±1 V, there are prepared 20 tables with a step of 0.1 V, and the data of the correction tables for x=0, 0.1, 0.2, . . . with the calculated coefficients a, b.

At the subsequent operations of the apparatus, the offset correction is achieved by dividing the output of the focus position detection unit 53 in ranges of −0.05 to 0.05, 0.05 to 0.15. . . . and reading the data from a corresponding table and setting it in the D/A converter 48.

|Embodiment 5|

The offset of the tracking error signal, at the variation of the position in the focusing direction, can also be measured in the following manner.

While the focusing servo is turned on, the output of the actuator focus position detection unit 53 and the offset of the tracking error signal are measured and averaged for a period shorter than the turning period of the disc. This operation is repeated plural times, and, based on these data, the relationship between the focus position of the actuator and the offset is calculated by approximation.

As an example, in the case of a disc revolution of 3600 rpm, one turn requires 16.66 ms. After the start of measurement, the output of the focus position detection unit is averaged, for example, for 4 ms. At the same time, the offset of the tracking error signal is averaged for the same period of 4 ms. Then, the output of the focus position detection unit and the offset of the tracking error signal are averaged for a next period of 4 ms.

By measuring the output of the focus position detection unit 53 and the offset of the tracking error signal in this manner on different two points along the circumference of the disc, it becomes possible to determine the coefficients a, b by linear approximation as in the foregoing embodiment, and thus to determine the relationship between the output of the focus position detection unit and the correcting offset.

It is further possible to continue the measurement for each period of 4 ms to obtain plural sets of measured data, and to calculate the coefficients a, b from two sets of data constituting the maximum and minimum of the output of the focus position detection unit. This method has the following advantage. In the case of measurement at two points only, if the two measured positions have, by coincidence, mutually similar focus positions because of the manner of distortion of the disc, the precision of the coefficients a, b becomes insufficient. On the other hand, high precision of the coefficients a, b can be assured by effecting the measurement in plural positions and taking the data of maximum and minimum focus positions.

Furthermore, approximation by a minimum square method may be applied to the focus positions and offset data in plural measuring points. In such a case, there can be realized approximation of a second or higher order with plural sets of data, whereby the accuracy of calculation of the coefficients can be further improved.

What is claimed is:

1. An information recording/reproducing apparatus provided with an actuator capable of integrally moving a mirror for directing a light beam from a light source toward a disc surface and an objective lens for condensing the light beam, in the focusing direction, said apparatus comprising:

means for detecting a tracking error signal representing a deviation of the light beam from a track on the disc;

means for measuring an offset value of said tracking error signal, generated by the movement of said actuator in the focusing direction, at a plurality of positions on the disc in a circumferential direction, by utilizing said tracking error signal;

means for correcting said tracking error signal at the plurality of positions on the disc in the circumferential direction, based on said measured offset value; and means for moving the position of the light beam on the disc surface in the tracking direction, based on said corrected tracking error signal.

2. An apparatus according to claim 1, wherein said offset measuring means measures said offset value by measuring a DC component of said tracking error signal.

3. An apparatus according to claim 1, further comprising means for detecting the position of said actuator in the focusing direction and means for storing said offset value in each position of said actuator in the focusing direction;

wherein said correcting means is adapted to read the offset value from said memory means based on the detected position and to correct said tracking error signal based on thus read offset value.

4. An apparatus according to claim 1, wherein said offset measuring means measures said offset at each loading of the disc.

5. An apparatus according to claim 1, further comprising means for rotating the disc and means for detecting the rotational phase of the disc;

wherein said offset measuring means measures said offset, based on said detected rotational phase.

6. An apparatus according to claim 1, wherein said correcting means subtracts said offset value from said tracking error signal.

7. An apparatus according to claim 1, further comprising means for calculating the offset value in a position other than the positions of measurement, utilizing the measured offset value at the plurality of positions.

8. An apparatus according to claim 7, wherein said calculating means calculates said offset value by linear approximation.

9. An apparatus according to claim 1, wherein said offset measuring means measures said offset value by averaging a positive peak value and a negative peak value of said tracking error signal.

10. An information recording/reproducing method for effecting information recording and/or reproduction under focus control by integral movement of a mirror for directing a light beam from a light source toward a disc surface and an objective lens for condensing said light beam, said method comprising steps of:

detecting a tracking error signal representing a deviation of the light beam from a track on the disc;

measuring an offset value of the tracking error signal, generated by the movement of the actuator in the focusing direction, at a plurality of positions on the disc in a circumferential direction, utilizing the tracking error signal;

correcting the tracking error signal at the plurality of positions on the disc in the circumferential direction, based on the measured offset value; and moving the position of the light beam on the disc surface in the tracking direction, based on the corrected tracking error signal.

* * * * *

UNITED STATES PATENT AND TRADEMARK OFFICE
CERTIFICATE OF CORRECTION

PATENT NO. : 5,796,687

DATED : August 18, 1998

INVENTOR : HISATOSHI BABA

It is certified that error appears in the above-identified patent and that said Letters Patent is hereby corrected as shown below:

COLUMN 2:
Line 67, "resulting in" should read --resulting from--.

COLUMN 3,
Line 46, "a" should be deleted; and
Line 47, "effect" should read --effect a--.

COLUMN 6,
Line 25, "KHz" should read --kHz--;
Line 36, "subtractor" should read --subtracter--;
Line 51, "a" should be deleted; and
Line 52, "(so-called" should read --(a so-called--.

COLUMN 8,
Line 47, "on" should read --of--; and
Line 48, "case" should be deleted.

COLUMN 10,
Line 9, "rotation" should read --revolution--.

UNITED STATES PATENT AND TRADEMARK OFFICE
CERTIFICATE OF CORRECTION

PATENT NO. : 5,796,687

DATED : August 18, 1998

INVENTOR : HISATOSHI BABA

It is certified that error appears in the above-identified patent and that said Letters Patent is hereby corrected as shown below:

<u>COLUMN 13</u>:
Line 24, "different two" should read --two different--.

<u>COLUMN 14</u>,
Line 16, "thus" should read --the thus--.

Signed and Sealed this

Eighteenth Day of May, 1999

Attest:

Q. TODD DICKINSON

Attesting Officer

Acting Commissioner of Patents and Trademarks